(12) United States Patent
Sung

(10) Patent No.: US 7,528,907 B2
(45) Date of Patent: May 5, 2009

(54) METHODS OF FORMING MIRROR LAYERS AND STRUCTURES THEREOF

(75) Inventor: Yung-Sheng Sung, San-Chung (TW)

(73) Assignee: Taiwan Semiconductor Manufacturing Company, Ltd., Hsin-Chu (TW)

( * ) Notice: Subject to any disclaimer, the term of this patent is extended or adjusted under 35 U.S.C. 154(b) by 372 days.

(21) Appl. No.: 11/341,399

(22) Filed: Jan. 26, 2006

(65) Prior Publication Data
US 2007/0171338 A1    Jul. 26, 2007

(51) Int. Cl.
*G02F 1/1333* (2006.01)
*G02F 1/1335* (2006.01)

(52) U.S. Cl. .................. 349/113; 349/114; 349/115; 349/122; 349/138; 349/158

(58) Field of Classification Search ......... 349/113–115, 349/122, 138, 158
See application file for complete search history.

(56) References Cited

U.S. PATENT DOCUMENTS

| 6,569,699 | B1 | 5/2003 | Lin et al. | |
|---|---|---|---|---|
| 6,750,836 | B1* | 6/2004 | Katayama et al. | 345/92 |
| 6,822,268 | B2* | 11/2004 | Lin et al. | 257/98 |
| 2002/0176036 | A1* | 11/2002 | Kaneko | 349/65 |
| 2004/0061816 | A1* | 4/2004 | Tsuchiya et al. | 349/113 |

* cited by examiner

*Primary Examiner*—Charlie Peng
*Assistant Examiner*—Jerry Blevins
(74) *Attorney, Agent, or Firm*—Duane Morris LLP

(57) ABSTRACT

A material of a mirror layer is formed within a trench and a via hole. The trench is formed in a dielectric layer over a substrate. The via hole is formed within the trench. The material within the trench is the mirror layer. The material within the via hole is a via plug. The mirror layer is continuous with the via plug.

21 Claims, 6 Drawing Sheets

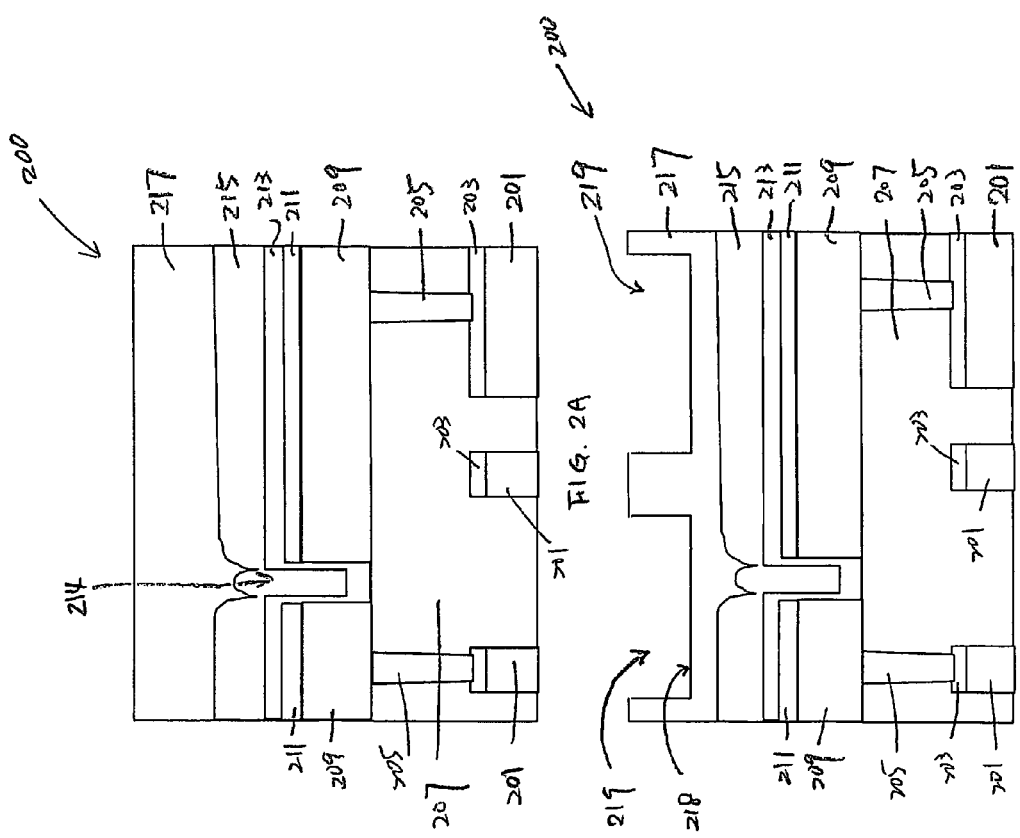

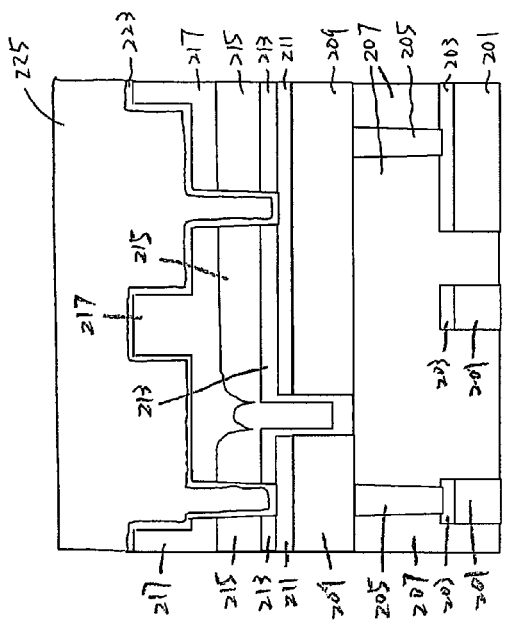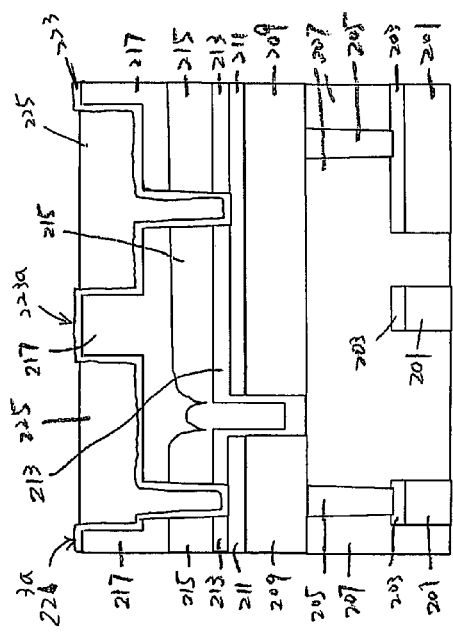

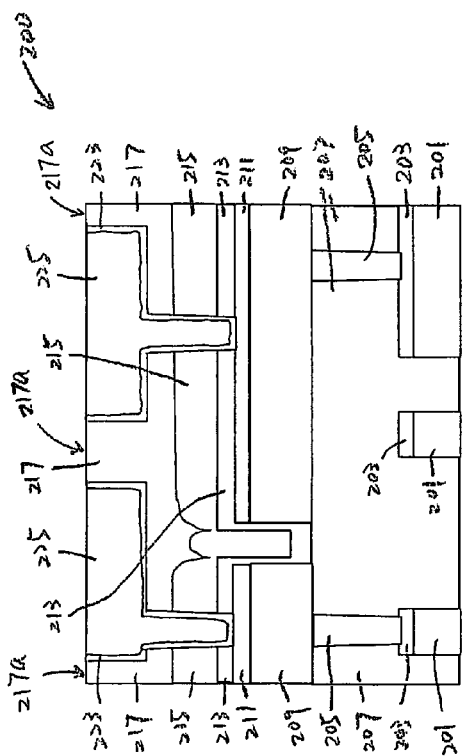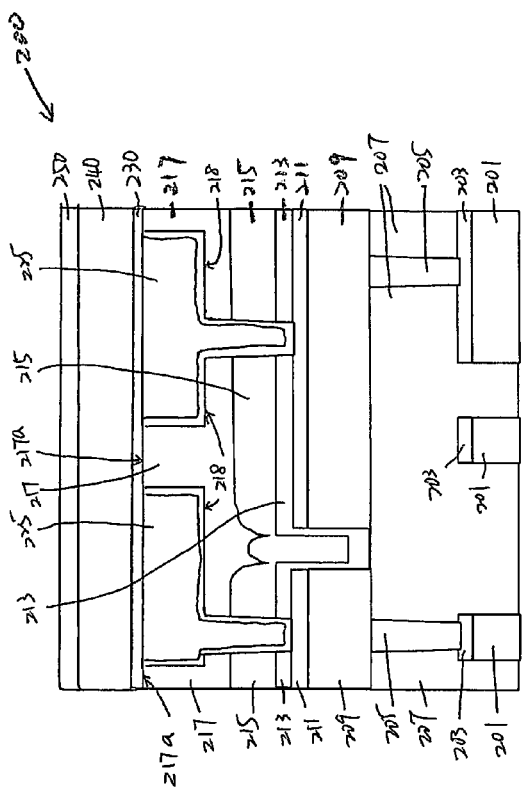

US 7,528,907 B2

METHODS OF FORMING MIRROR LAYERS AND STRUCTURES THEREOF

BACKGROUND OF THE INVENTION

1. Field of the Invention

The present invention relates to semiconductor structures and processes thereof; more particularly, to structures of Liquid Crystal On Silicon (LCOS) and methods of forming structures of LCOS.

2. Description of the Related Art

Liquid Crystal Displays (LCDs) have been applied in variety of electronic products, such as TV, personal computers, cellular phones, portable devices and other electronic devices. Aggregate demand for LCDs is projected to increase throughout the world. Since LCD pixels are usually assembled with semiconductor electronic circuits, Liquid Crystal On Silicon (LCOS) technology has been proposed in order to cost-efficiently integrate LCD pixels and integrated semiconductor circuits.

LCOS is a reflective LCD panel. It includes a liquid crystal layer disposed over a pixel-related substrate. With routing and switching devices below the LCD panel, LCOS generates a near-seamless image. Due to the integration of LCD and semiconductor technologies, LCOS technology reduces dimensions and manufacturing costs of LCDs without compromising image quality displayed thereby.

FIGS. 1A-1C are cross-sectional views of a prior art method of forming Liquid Crystal On Silicon (LCOS), shown step-by-step.

Referring to FIG. 1A, the substrate 100 comprises a metal layer 110, a dielectric layer 120 and a contact/via plug 130. The metal layer 110 is electrically coupled to integrated circuits (not shown) formed on the substrate 100. The contact/via plug 130 is formed within the dielectric layer 120. The contact/via plug 130 is usually formed by Chemical-Mechanical Polish (CMP) or a tungsten (W) etch back process. Due to the use of CMP or W etch back, a recess 135 is formed at the top of the contact/via plug 130.

FIG. 1B is a cross-sectional view of the prior art structure of FIG. 1A, after the formation of metal mirror layers.

Referring to FIG. 1B, a metal mirror layer 140 is formed over the structure shown in FIG. 1A. The metal mirror layer 140 is then patterned to form the opening 150 therein to isolate the metal mirror layers 140, which correspond to different pixels. After the formation of the metal mirror layer 140, a dimple 145 is formed on the top surface of the metal mirror layer 140.

FIG. 1C is a cross-sectional view of the prior art structure after a formation of another dielectric layer within the opening 150 of FIG. 1B.

Referring to FIG. 1C, another dielectric layer 160 is formed over the structure of FIG. 1B. The dielectric layer 160 over the surface of the metal mirror layer 140 is removed by an etch process, except in the opening 150. After the removal of the dielectric layer 160, a recess 165 is formed on the top of the dielectric layer 160. The recess 165 causes light interference between neighboring pixels of LCOS. The dimple 135 also deteriorates reflection of incident light from the surface of the metal mirror layer 140.

U.S. Pat. No. 6,822,268 discloses a method of fabricating an LCD-on-silicon pixel device. An opaque conducting layer is deposited over the silicon layer, filling the via. The opaque conducting layer is planarized, and a reflective layer is deposited over the opaque conducting layer. The via may be formed by a deposition and etch back process with one metal. An opaque conducting layer is then deposited and planarized before deposition of the reflective layer. This patent also discloses an LCD-on-silicon pixel device. The device comprises a substrate having an upper silicon layer. The upper silicon layer has a plug therein comprised of an opaque conducting material. Over the upper silicon layer and the opaque conducting plug is a planar opaque conducting layer, and a planar reflective layer is over the planar opaque conducting layer.

From the foregoing descriptions, improved methods to form LCOS and structures of LCOS are desired.

SUMMARY OF THE INVENTION

In some embodiments, a structure comprises a material of a mirror layer formed within a trench and a via hole. The trench is formed in a dielectric layer over a substrate. The via hole is formed within the trench. The material within the trench is the mirror layer. The material within the via hole is a via plug. The mirror layer is continuous with the via plug In some embodiments, a structure of Liquid Crystal On Silicon (LCOS) comprises a material of a mirror layer formed within a trench and a via hole. The trench is formed in a dielectric layer over a substrate. The via hole is formed within the trench. The material within the trench is the mirror layer. The material within the via hole is a via plug. The mirror layer is continuous with the via plug. The mirror layer is continuous with the via plug.

In some embodiments, a method of forming a structure of Liquid Crystal On Silicon (LCOS) comprises: (a) forming a trench in a dielectric layer on a substrate, (b) forming a via hole within the trench in the dielectric layer, and (c) depositing a mirror layer material in the trench and the via hole simultaneously to form a mirror layer.

The above and other features of the present invention will be better understood from the following detailed description of the preferred embodiments of the invention that is provided in connection with the accompanying drawings.

BRIEF DESCRIPTION OF THE DRAWINGS

FIGS. 2A-2H illustrate cross-sectional views of step-by-step drawings of a method of forming a structure of Liquid Crystal On Silicon (LCOS) according to an exemplary embodiment.

DESCRIPTION OF THE PREFERRED EMBODIMENT

Figure 1A:
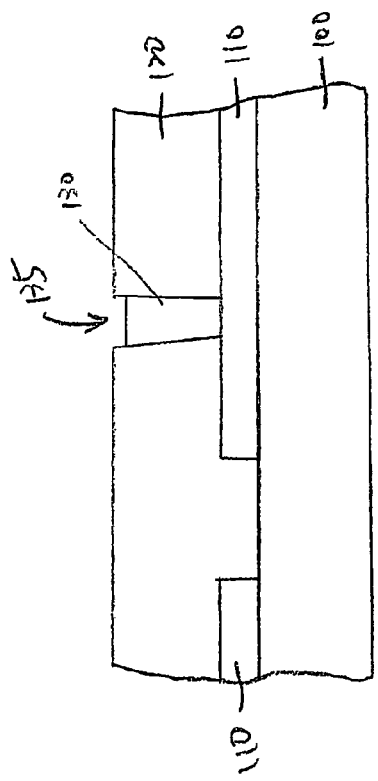
FIGS. 1A-1C illustrate cross-sectional views of step-by-step drawings of a prior art method of forming Liquid Crystal On Silicon (LCOS).
Figure 1B:
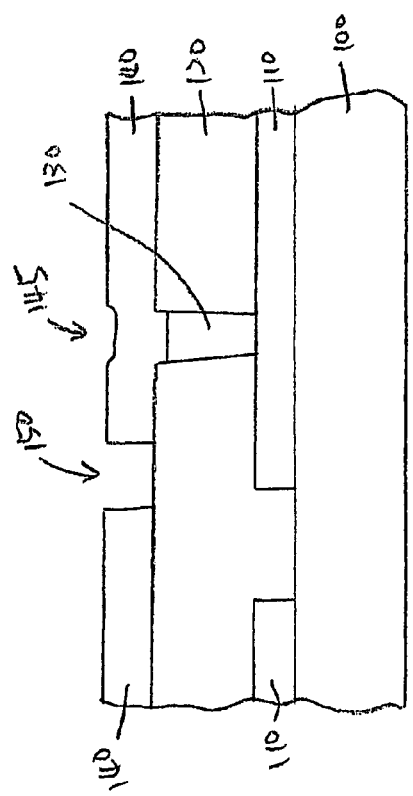
Figure 1C:
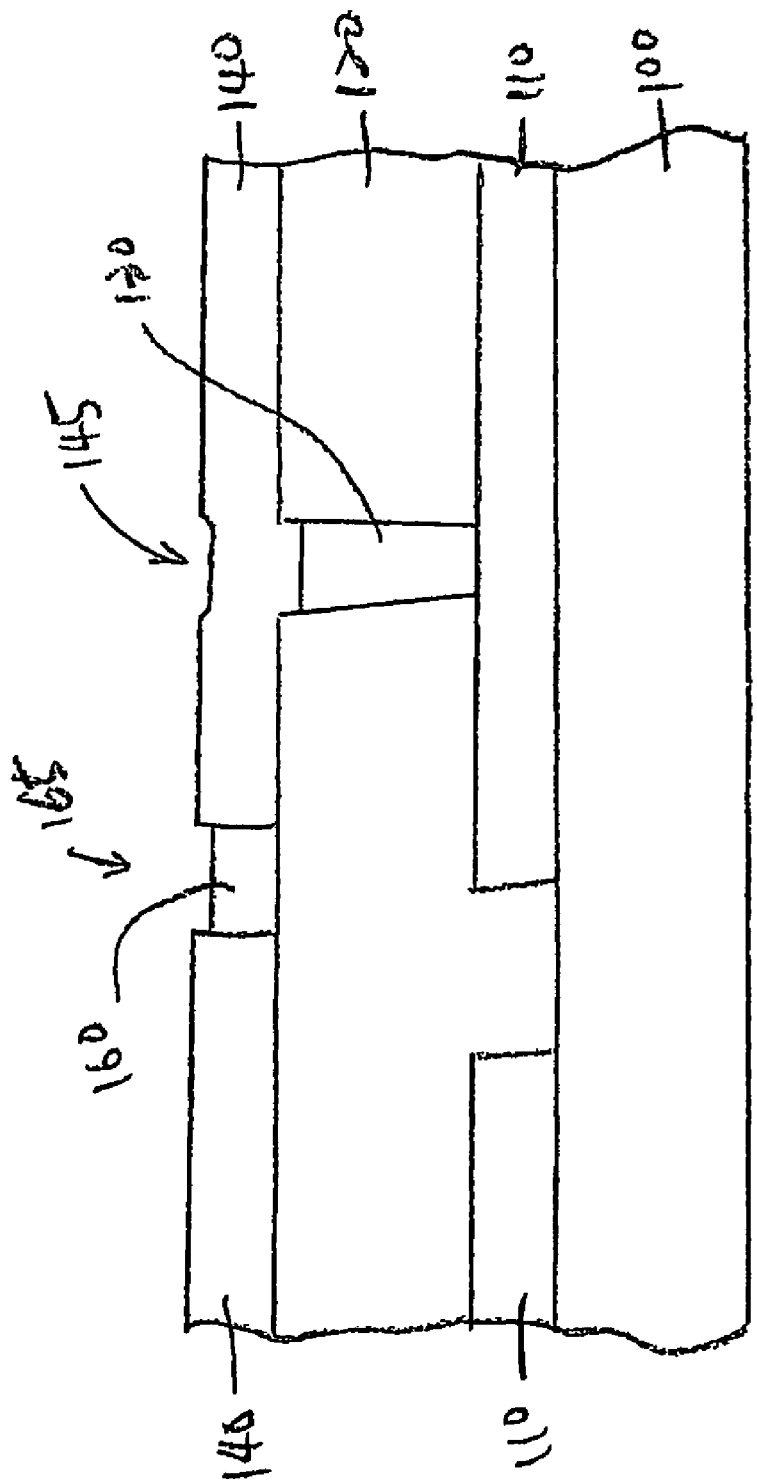

This description of the exemplary embodiments is intended to be read in connection with the accompanying drawings, which are to be considered part of the entire written description. In the description, relative terms such as "lower," "upper," "horizontal," "vertical," "above," "below," "up," "down," "top" and "bottom" as well as derivative thereof (e.g., "horizontally," "downwardly," "upwardly," etc.) should be construed to refer to the orientation as then described or as shown in the drawing under discussion. These relative terms are for convenience of description and do not require that the apparatus be constructed or operated in a particular orientation.

FIGS. 2A-2H are cross-sectional views of step-by-step drawings of a method of forming a structure of Liquid Crystal On Silicon (LCOS) according to an exemplary embodiment.

Because of the complexity of these drawings, cross-hatching is omitted from FIGS. 2A-2H.

FIG. 2A is a cross-sectional view of a substrate 200 with various semiconductor structures formed thereon. The substrate 200 can be, for example, a silicon substrate, a III-V compound substrate, a glass substrate, a printed circuit board (PCB) or any other substrate similar thereto. In addition, the substrate 200 may comprise various semiconductor structures thereon to provide desired electrical functions. In one embodiment, the substrate comprises a first metal layer 201, a first cap layer 203, vias or contact plugs 205, an inter metal dielectric (IME) layer 207, a second metal layer 209, a second cap layer 211, a first dielectric layer 213, and a second dielectric layer 215. The first metal layer 201 is formed on the substrate 200. The first cap layer 203 is formed on the top surface of the first metal layer 201. The IMD layer 207 covers the first metal layer 201 and the first cap layer 203. The vias or contact plugs 205 are formed within the IMD layer 207. The second metal layer 209 is formed over the IMD layer 207. The vias or contact plugs 205 contact the first cap layer 203 and the second metal layer 209. The second cap layer 211 is formed on the second metal layer 209. An opening 214 is formed within the second metal layer 209 and the second cap layer 211. The first dielectric layer 213 is formed substantially conformal over the structure formed by the second metal layer 209, the second cap layer 211 and the opening 214. The second dielectric layer 215 is filled within the opening 214 and covers the second cap layer 213.

The first metal layer 201 can be made of, for example, aluminum (Al), copper (Cu), Al/Cu or other conductive materials. The first cap layer 203 can be made of titanium (Ti), titanium nitride (TiN), Ti/TiN or other materials that are adapted to protect the first metal layer 201 from damage due to subsequent semiconductor processes. The IMD layer 207 can be made of, for example, silicon oxide, silicon nitride, silicon oxy-nitride, low-dielectric constant materials or other materials that are able to separate and isolate the metal layers 201 and 209. The vias or contact plugs 205 can be made of, for example, aluminum (Al), copper (Cu), Al/Cu or any other conductive materials. The second metal layer 209 and the second cap layer 211 are similar to the first metal layer 201 and the first cap layer 203, respectively. Detailed descriptions are not repeated. The opening 214 can be formed by a photolithographic technique and an etch technique. The first dielectric layer 213 comprises, for example, silicon oxide, silicon nitride, silicon oxy-nitride or other materials that are adapted to protect the second cap layer 213 from damage due to subsequent processes. In one embodiment, the first dielectric layer 213 is silicon oxy-nitride. The second dielectric layer 215 is made of silicon oxide, silicon nitride, silicon oxy-nitride, low-dielectric constant materials or other materials that fill the opening 214. In some embodiments, the second dielectric layer 215 is an oxide layer deposited by high density plasma chemical vapor deposition (HDP CVD). The third dielectric layer 217 is then formed over the second dielectric layer 215. The third dielectric layer 217 can be made of silicon oxide, silicon nitride, silicon oxy-nitride, low-dielectric constant materials or other materials which are adapted to support formation of mirror layers of LCOS therein. In some embodiments, the third dielectric layer 217 is plasma enhanced tetraethoxysilane (PETEOS) oxide.

The structure set forth above is mere an exemplary structure. Methods forming these layers and the structure are well known in the semiconductor industry. Detailed descriptions are not required by those of ordinary skill in the art. In addition, one skilled in the art can readily modify the structure shown in FIG. 2A according to a desired design. For example, some layers, such as the first cap layer 203, the second cap layer 211 and the first dielectric layer 213 can be omitted, if the omission of the layers does not cause the semiconductor process or structure to fail. Furthermore, the second dielectric layer 215 and the third dielectric layer 217 can be the same layer in some embodiments, if a single dielectric layer can fill in the opening 214 and also form mirror layers of LCOS. One of ordinary skill in the art will readily understand how to design modifications to the structure set forth in connection with FIG. 2A to form a desired semiconductor structure.

FIG. 2B is a cross-sectional view of an exemplary structure showing trenches formed within a dielectric layer.

Referring to FIG. 2B, trenches 219 are formed within the third dielectric layer 217. The trenches 219 can be formed by, for example, photolithographic and etch techniques. Each of these trenches 219 has a width about 1.0 μm to about 1.4 μm, and a depth from 0.2 μm to about 0.4 μm. In an exemplary embodiment, each of the trenches 219 has a width of about 1.2 μm. The trenches 219 are adapted to have mirror layers 225 (shown in FIG. 2G) formed therein. Each of the trenches 219 corresponds to a pixel device of LCOS. The dimensions of the trenches 219 vary in correspondence with dimensions of the pixel devices of LCOS. When the dimensions of the pixel device of LCOS are reduced, the width and depth of the trench 219 should also be changed. One skilled in the art understands how to modify the dimensions of the trenches 219.

The trenches 219 are separated by the remaining portions of the third dielectric layer 217. In some embodiments, the trenches 219 are formed within the third dielectric layer 217. The surface 218 of the trenches is between the top surface and the bottom surface of the third dielectric layer 217. In some embodiments, the surfaces 218 of the trenches 219 are formed between the second dielectric layer 215 and the first dielectric layer 213, if the electrical and mechanical characteristics of LCOS are not affected. One skilled in the art can readily modify the structure according to the descriptions set forth in connection with FIG. 2B to form a desired semiconductor structure.

Figure 2C:
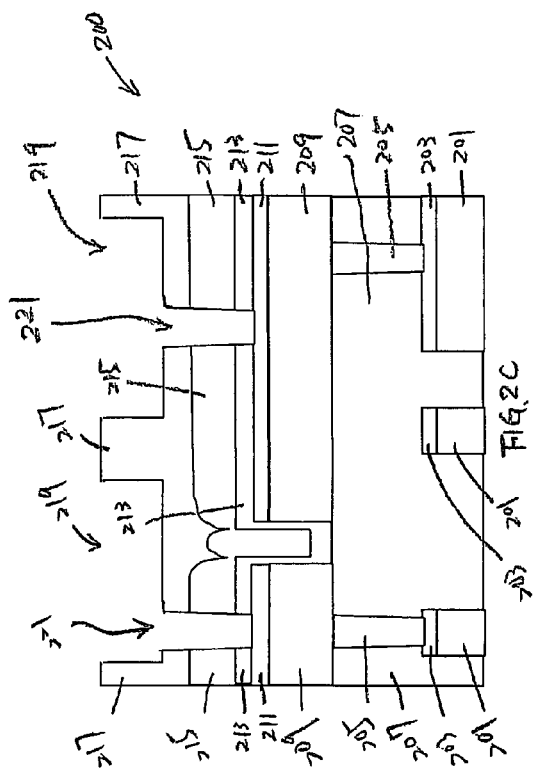

FIG. 2C is a cross-sectional view of an exemplary structure showing via holes formed within dielectric layers.

Referring to FIG. 2C, via holes 221 are formed in the first, the second and the third dielectric layers 213, 215 and 217, respectively. In addition, each of the via holes 221 is formed within the corresponding trench 219. The via holes 221 can be formed by, for example, photolithographic and etch techniques. Each of these via holes 221 has a width about from 0.25 μm to about 0.5 μm, and a depth from the bottom surface of the trenches 219 to the top surface of the second cap layer 211 is from about 0.6 μm to about 0.8 μm. The dimensions of the via holes 221 vary with technology in forming the mirror layer of LCOS. One skilled in the art can readily modify the dimensions of the via holes 221 for any given configuration.

In the sequential drawings of FIGS. 2A-2C, the trenches 219 are formed prior to the via holes 221. In some embodiments, however, the via holes 221 are formed prior to the formation of trenches 219. In order to first form the via holes 221, some additional process steps may be required to be performed prior to the formation of the trenches 219. For example, a protective material (not shown) is filled in the via holes 221 prior to the formation of the trenches 219 to protect the top surface of the cap layer 211 from damage caused by the formation process of the trenches 219. With the descriptions set forth above, one skilled in the art can readily modify the process of forming mirror layers of LCOS.

Figure 2D:
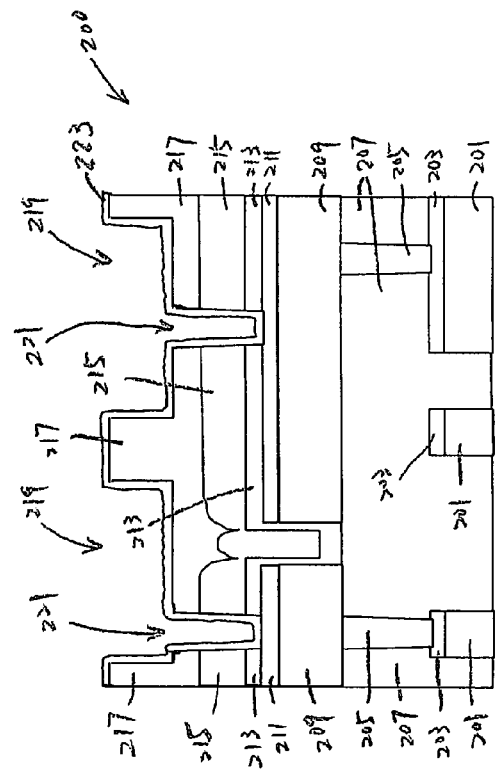

FIG. 2D is a cross-sectional view of an exemplary structure showing a barrier layer substantially conformal over the structure depicted in FIG. 2C.

Referring to FIG. 2D, the barrier layer 223 is substantially conformal over the structure shown in FIG. 2C. The barrier layer 223 can be made of, for example, Ti, TiN, Ti/TiN, tantalum (Ta), tantalum nitride (TaN), or other materials which are adapted to prevent interaction between the structure therebelow and the to-be-formed material 225 of mirror layers (shown in FIG. 2G). In an exemplary embodiment, the barrier layer 223 is a Ti/TiN layer with a thickness about 700 Å. The thickness of the barrier layer 223 varies with the process technology. The barrier layer 223 can be formed by Chemical Vapor Deposition (CVD), Physical Vapor Deposition (PVD) or other methods which are suitable for forming the substantially conformal barrier layer 223 as shown in FIG. 2D. In some embodiments, the barrier layer 223 does not need to be substantially conformal over the structure shown in FIG. 2C, if the non-conformal structure does not cause pin holes within the via or contact holes 221 or cause other structure failures. In some embodiments, the barrier layer is not required and can be eliminated, if the subsequent material (not shown) filled within the via or contact holes 221 and the trenches 219 substantially does not interact with, or contaminate the dielectric layers 213, 215 and 217.

FIG. 2E is a cross-sectional view of an exemplary structure showing a material of mirror layers formed over the structure depicted in FIG. 2D.

Referring to FIG. 2E, the material 225 of mirror layers is formed over the structure shown in FIG. 2D. The material 225 also fills the trenches 219 and the via holes 221. The material 225 can be, for example, Al, Cu, Al/Cu or other materials which are capable of serving as mirror layers in the trenches 219 and serving as via plugs in the via holes 221. In an exemplary embodiment, the material 225 is Al with thickness about 6,000 Å. The thickness of the material 225 varies with the process technique. The thickness of the material 225 may be reduced if the dimensions of the pixel devices of LCOS shrink. The material 225 can be formed by, for example, CVD, PVD, electroplating, chemical electroless plating or other methods that form the material 225 with substantially planarized surface within the trenches 219 and the via holes 221.

FIG. 2F is a cross-sectional view of an exemplary structure after the removal of the material of the mirror layer over the top surface of the dielectric layer.

Referring to FIG. 2F, the material 225 over the top surface of the barrier layer 223 is removed. The process removing the material 225 may comprise, for example, a Chemical Mechanical Polish (CMP) process or an etch back process. The barrier layer 223 serves for end-point detection. That is, etching of material 225 continues until a portion of the barrier layer 223 between adjacent trenches 219 is exposed. In some embodiments, with Al serving as the material 225, the process for removing the material 225 comprises a CMP process. The CMP process uses an $Al_2O_3$ slurry in cooperation with rotation of the polish pad. For an etch-back embodiment, etchants with a Cl-radical are provided for removing Al. One skilled in the art can readily identify and use different suitable slurries and etchants for materials, such as Cu or Al/Cu, because the technology of slurries and etchants corresponding to these materials is mature in the semiconductor industry.

FIG. 2G is a cross-sectional view of an exemplary structure after the top portion of the barrier layer shown in FIG. 2F is removed.

Referring to FIG. 2G, the top portion of the barrier layer 223 is removed to expose the top surface 217a of the third material layer 217. The process for removing the top portion of the third material layer 217 may comprise, for example, a Chemical Mechanical Polish (CMP) process or an etch back process. For a CMP embodiment, the CMP process uses an $Al_2O_3$ slurry in cooperation with rotation of the polish pad. In the exemplary embodiment, the process for removing the top portion of the third material layer 217 is an etch back process. The etch back process comprises using an etchant with a Cl-radical to remove the top portion of the third material layer 217. The etchant comprises, for example, $Cl_2$, $BCl_3$, $B_2Cl_6$ or other etchants which are adapted to remove Al. In an exemplary embodiment, the etchant comprises $B_2Cl_6$. The etchant has a high etch selectivity for the barrier layer 223 with respect to the material 225 so that the barrier layer 223 can be easily removed substantially without causing recess of the material 225 in the trench 219. One skilled in the art can readily identify different slurries and etchants suitable for materials, such as Cu or Al/Cu. In one embodiment, the barrier layer 223 is formed under the material 225 as shown in FIG. 2F. The material 225 does not have the barrier layer 223 therein.

In some embodiments, the barrier layer 223 is not required, if the material 225 filled within the via or contact holes 221 and the trenches 219 substantially does not interact with, or contaminate the dielectric layers 213, 215 and 217. For these embodiments, the top surface 217a of the third dielectric layer 217 serves for end-point detection. That is, etching of layer 217 continues until the portions 217a of the third dielectric layer 217 are exposed. Process steps of these embodiments without the barrier layer 223 are similar to those set forth above. Detailed descriptions are not repeated.

FIG. 2H is a cross-sectional view of an exemplary structure after a passivation layer, a liquid crystal layer and a transparent electrode are sequentially formed over the structure of FIG. 2G.

Referring to FIG. 2H, the passivation layer 230 prevents contact between the material 225 of the mirror layer and the liquid crystal layer 240. The passivation layer 230 can be made of, for example, silicon oxide, silicon nitride, silicon oxy-nitride or other materials which are adapted to insulate the material 225 of the mirror layer from the liquid crystal layer 240. The passivation layer 230 can be formed by CVD, PVD, spin-coating or other methods which are adapted to form a thin film layer. In an exemplary embodiment, the passivation layer 230 comprises silicon oxide/silicon nitride with thickness about 600 Å/600 Å. The composition of the passivation layer 230 varies for different techniques. One skilled in the art understands how to modify the structure and thickness of the passivation layer 230.

The liquid crystal layer 240 is then formed over the passivation layer 230. The liquid crystal layer 240 can be formed by, for example, a spin-coating process or other processes which are adapted to form a liquid crystal film. The transparent electrode 250 is then formed over the liquid crystal layer 240 by, for example, CVD, PVD, spin-coating or other methods which are adapted to form a film similar thereto. In some embodiments, the transparent electrode 250 comprises indium-tin-oxide (ITO).

In some embodiments, two liquid crystal alignment layers (not shown) are formed between the passivation layer 230 and the liquid crystal layer 240, and between the liquid crystal layer 240 and the transparent electrode 250.

Dimensions of the structure set forth above in connection with FIGS. 2A-2H varies with technology applied therein. Moreover, dimensions of the structure also changes if different design circuits are intended to be made. One skilled in the art thus is readily able to modify these dimensions to fit into a desired design and technology.

Referring to FIG. 2H again, the material 225 within the trench 219, i.e., a mirror layer, directly contacts and is continuous with the material 225 within the via hole 221, i.e., a via plug, without interface or discontinuity, because the material 225 is filled within the trench 219 and the via hole 221 simultaneously. Here, the term of "interface" or "discontinuity" means a boundary formed by neighboring thin film layers, rather than inherent grain boundary interfaces or inherent grain phases of the material 225. In addition, an interface or discontinuity may be formed by a thin film layer, e.g., a barrier layer, between two adjacent structures or layers, e.g., a via and a trench. In the example, such interfaces and discontinuities are not present. Moreover, there is no discontinuity between the portion of third dielectric layer 217 above the surface 218 of the trench 219 and the portion of dielectric layer 217 below the surface 218 of the trench 219. The material 225 within the trenches 219 serve as mirror layers. The top surface 217a of the dielectric layer adjacent to the top surface of the mirror layer is substantially free of recesses. Reflection of incident visible light on the top surface of the mirror layer is more than about 90%.

Although the present invention has been described in terms of exemplary embodiments, it is not limited thereto. Rather, the appended claims should be constructed broadly to include other variants and embodiments of the invention which may be made by those skilled in the field of this art without departing from the scope and range of equivalents of the invention.

What is claimed is:

1. A structure, comprising:
    a dielectric layer disposed over a substrate, the dielectric layer having a top surface and a bottom surface, the dielectric layer defining a trench between the top surface and the bottom surface and defining a via hole within the trench; and
    a material of a mirror layer within the trench and the via hole, the mirror layer having a top surface that is substantially even with the top surface of the dielectric layer, wherein:
        the material within the trench is the mirror layer,
        the material within the via hole is a via plug, and
        the material of the mirror layer is continuous with and the same material as the material of the via plug.

2. The structure of claim 1, wherein there is no discontinuity between the dielectric layer above a surface of the trench and the dielectric layer below the surface of the trench.

3. The mirror layer of claim 1, wherein a width of the trench is from about 1.0 µm to about 1.4 µm.

4. The mirror layer of claim 1, wherein top surface of the dielectric layer adjacent to the top surface of the mirror layer is substantially free of recesses.

5. The mirror layer of claim 1, wherein reflection of incident visible light on the top surface of the mirror layer is more than about 90%.

6. A structure of Liquid Crystal On Silicon (LCOS), comprising:
    a substrate;
    a dielectric layer formed over the substrate, the dielectric layer having a top surface and a bottom surface, the dielectric layer defining a trench between the top surface and the bottom surface and defining a via hole within the trench;
    a material of a mirror layer within the trench and the via hole, the mirror layer having a top surface that is substantially even with the top surface of the dielectric layer; and
    a liquid crystal layer disposed over the top surface of the mirror layer,
    wherein the material within the trench is the mirror layer, the material within the via hole is a via plug, and the material of the mirror layer is continuous with and the same material as the material of the via plug.

7. The structure of claim 6, wherein there is no discontinuity between the dielectric layer above a surface of the trench and the dielectric layer below the surface of the trench.

8. The structure of claim 6, wherein a width of the trench is from about 1.0 µm to about 1.4 µm.

9. The structure of claim 6, wherein the top surface of the dielectric layer adjacent to the top surface of the mirror layer is substantially free of recesses.

10. The structure of claim 6, wherein reflection of incident visible light on the top surface of the mirror layer is more than about 90%.

11. The structure of claim 6, further comprising a transparent electrode over the liquid crystal layer.

12. The structure of claim 11, wherein the transparent electrode comprises indium-tin-oxide (ITO).

13. A method of forming a structure of Liquid Crystal On Silicon (LCOS), comprising steps of:
    (a) forming a trench in a dielectric layer on a substrate, the dielectric layer having a top surface and a bottom surface;
    (b) forming a via hole within the trench in the dielectric layer; and
    (c) depositing a mirror layer material in the trench and the via hole simultaneously to form a mirror layer; and
    (d) removing a portion of the mirror layer material such that a top surface of the material layer is substantially even with the top surface of the dielectric layer.

14. The method of claim 13, wherein step (a) forms a surface of the trench between the top surface and the bottom surface of the dielectric layer.

15. The method of claim 13, wherein the removing step is performed by a Chemical-Mechanical Polish (CMP) process or an etch-back process.

16. The method of claim 13, further comprising forming a barrier layer between the dielectric layer and the mirror layer material.

17. The method of claim 16, using the barrier layer on the top surface of the dielectric layer for end-point detection during the removing step.

18. The method of claim 13, further comprising forming a liquid crystal layer over the mirror layer.

19. The method of claim 18, further comprising forming a transparent electrode over the liquid crystal layer.

20. A structure, comprising:
    a substrate;
    a first dielectric layer disposed over the substrate;
    a second dielectric layer disposed over the first dielectric layer, the second dielectric layer defining a first trench and a second trench, each of the first and second trenches having a bottom surface vertically disposed between an upper surface of the second dielectric layer and a lower surface of the second dielectric layer, the second trench disposed horizontally adjacent to the first trench, each of the first and second trenches having a via formed therein, the vias extending from the bottom surfaces of the first and second trenches into the first dielectric layer;
    a first continuous mirror layer comprising aluminum disposed within the first trench and the via within the first trench; and
    a second continuous mirror layer comprising aluminum disposed with the second trench and the via within the second trench.

21. The structure of claim 20 further comprising:
    a passivation layer disposed over the second dielectric layer and the first and second continuous mirror layers;
    a liquid crystal layer disposed over the passivation layer; and
    a transparent electrode disposed over the liquid crystal layer.

* * * * *

UNITED STATES PATENT AND TRADEMARK OFFICE
CERTIFICATE OF CORRECTION

PATENT NO. : 7,528,907 B2  Page 1 of 1
APPLICATION NO. : 11/341399
DATED : May 5, 2009
INVENTOR(S) : Yung-Sheng Sung It is certified that error appears in the above-identified patent and that said Letters Patent is hereby corrected as shown below:

Column 7, line 40, after "wherein" insert -- the --.

Signed and Sealed this

Eleventh Day of August, 2009

David J. Kappos
*Director of the United States Patent and Trademark Office*